(12) United States Patent
Forster (10) Patent No.: US 11,537,836 B2
(45) Date of Patent: Dec. 27, 2022

(54) MERCHANDISE ATTACHMENT WITH RFID TRANSPONDER

(71) Applicant: AVERY DENNISON RETAIL INFORMATION SERVICES LLC, Mentor, OH (US)

(72) Inventor: Ian J. Forster, Chelmsford (GB)

(73) Assignee: Avery Dennison Retail Information Services LLC, Mentor, OH (US)

(*) Notice: Subject to any disclaimer, the term of this patent is extended or adjusted under 35 U.S.C. 154(b) by 0 days.

(21) Appl. No.: 16/715,746

(22) Filed: Dec. 16, 2019

(65) Prior Publication Data

US 2020/0193260 A1      Jun. 18, 2020

Related U.S. Application Data

(60) Provisional application No. 62/780,174, filed on Dec. 14, 2018.

(51) Int. Cl.
*G06K 19/077*    (2006.01)
*B65D 23/14*    (2006.01)

(52) U.S. Cl.
CPC ....... *G06K 19/07773* (2013.01); *B65D 23/14* (2013.01)

(58) Field of Classification Search
CPC .......................... G06K 19/07773; B65D 23/14
See application file for complete search history.

(56) References Cited

U.S. PATENT DOCUMENTS

| 7,298,343 | B2 | 11/2007 | Forster et al. | |
| 8,072,334 | B2 | 12/2011 | Forster et al. | |
| 2008/0068176 | A1* | 3/2008 | Azuma | G06K 19/07767 |
| | | | | 340/572.7 |
| 2011/0114734 | A1 | 5/2011 | Tiedmann et al. | |
| 2015/0048170 | A1* | 2/2015 | Forster | G06K 19/0776 |
| | | | | 235/492 |
| 2015/0262463 | A1 | 9/2015 | Piccoli et al. | |
| 2017/0161601 | A1* | 6/2017 | Sevaux | G06K 19/07722 |
| 2019/0135501 | A1* | 5/2019 | Chandra | B65C 3/24 |
| 2019/0244072 | A1* | 8/2019 | Forster | G06K 19/0779 |

OTHER PUBLICATIONS

International Search Report and Written Opinion dated Apr. 7, 2020 issued in corresponding IA No. PCT/US2019/066562 filed Dec. 16, 2019.
International Preliminary Report on Patentability dated Jun. 8, 2021 issued in corresponding IA No. PCT/US2019/066562 filed Dec. 16, 2019.

* cited by examiner

*Primary Examiner* — Kristy A Haupt (57) ABSTRACT

A merchandise attachment incorporating an RFID transponder may be described herein. The merchandise attachment may include a pliable, elongated panel member adapted for wrapping around the neck of a bottle or similar container. The panel member may be formed from a unitary blank having score lines that divide the blank into a plurality of panel sections. The panel member, when folded along the score lines with its end sections in overlapping relationship, may form a packaging sleeve in the shape of a tapered rectangular prism. The exterior surface of the panel member may be provided with informational material regarding the merchandise, such as branding, promotional offers, and the like. The RFID transponder, affixed to an interior surface of the panel member, may be adapted for wirelessly communicating information in radio-frequency signals.

20 Claims, 6 Drawing Sheets

MERCHANDISE ATTACHMENT WITH RFID TRANSPONDER

CROSS REFERENCE TO RELATED APPLICATION(S)

The present application claims priority from U.S. Provisional Application No. 62/780,174 filed Dec. 14, 2018, which is incorporated by herein by reference in its entirety.

FIELD OF THE INVENTION

The invention generally relates to incorporating an RFID transponder into a merchandise attachment. More particularly, the merchandise attachment may include a pliable, elongated panel member adapted for wrapping around the neck of a bottle or similar container. The exterior surface of the panel member may be provided with informational material regarding the merchandise, such as branding, promotional offers, and the like. The RFID transponder, affixed to an interior surface of the panel member, may be adapted for wirelessly communicating information in radio-frequency signals.

BACKGROUND

Radio frequency identification (RFID) tags and labels (also known as "RFID transponders") use electromagnetic fields to exchange digital data, and specifically to associate a particular object with an identification code. RFID transponders generally include an antenna and an integrated circuit having, for example, communications electronics, data memory, and control logic. In particular, RFID transponders are designed to both store pertinent data relating to an object and, when induced, generate a radio frequency signal relating to said data which is in turn propagated by the antenna. A RFID reader (also known as a "RFID interrogator") is a network-connected device used to wirelessly obtain data (e.g., such as the aforementioned identification code) communicated from an RFID transponder, and deliver said data to operating-system software in order to identify, categorize, and/or track objects. Accordingly, RFID technology has become increasingly widespread in supply chain and retail environments, amongst others, to regulate products and inventory.

A RFID transponder is categorized by its mode of communication, as either a passive device, an active device, or a semi-passive device. Passive RFID devices, for example, do not have an internal power source and thus only transmit a signal upon receiving electromagnetic energy from a RFID reader in proximity. Semi-passive and active RFID devices, on the other hand, are provided with an onboard power source, such as a battery. RFID transponders also can be characterized as to those to which information is written only once (although the information may be read repeatedly), and those to which information may be written during use. For example, RFID tags may store environmental data (that may be detected by an associated sensor), logistical histories, state data, etc.

Current RFID tags and labels are constructed from an RFID inlay, which includes an integrated circuit or microchip that is used to carry the coded information and an antenna that is used to transmit and receive radio frequency signals. The RFID inlay is then incorporated into a single tag or label that can be applied to items or item packaging either directly (e.g., through the use of adhesive) or indirectly (e.g., through a fastener, string, plastic tie, etc.).

The sensitivity of an RFID tag can depend on the contents of the container to which it is attached. For example, conductive materials or materials having a high dielectric constant, for example, liquids or metals, can detune or substantially interfere with an RFID tag. Consequently, radio frequency communication is often difficult. What is needed, therefore, is an RFID tag that can be applied to products that have previously been difficult to label with RFID tags due to these performance issues.

SUMMARY

According to an exemplary embodiment, a merchandise attachment incorporating an RFID transponder may be described herein. The merchandise attachment may include a pliable, elongated panel member adapted for wrapping around the neck of a bottle or similar container. The panel member may be formed from a unitary blank having score lines that divide the blank into a number of panel sections and in an exemplary embodiment five panels are shown in the drawings. The panel member, when folded along the score lines with its end sections in overlapping relationship, may form a packaging sleeve in the shape of a tapered rectangular prism. Other geometric configurations are of course possible, including square, hexagon, octagon, etc. The exterior surface of the panel member may be provided with informational material regarding the merchandise, such as branding, promotional offers and the like.

The RFID transponder may be affixed to an interior surface of the panel member, traversing one or more of the panel sections, and, ideally at least three panel sections. The RFID transponder may include an RFID microchip electrically coupled to an antenna. The shape of the RFID inlay may substantially match that of the panel member in its flattened state. The RFID transponder may enable orientation insensitivity and outstanding edge read performance for a wide variety of tagging applications. The RFID transponder may communicate with an RFID reader to provide a variety of information about the merchandise (e.g., container) to which it is attached.

According to some embodiments, a merchandising piece comprises a blank of material divided into a series of panels, which are sized and configured so as to fit around a bottle or container, and a RFID inlay having an antenna and a chip connected to the antenna, the RFID inlay designed so as to be able to radiate from the bottle or container, where the RFID inlay is placed on at least one of the series of panels and positioned to be interior of the blank once folded and placed around the container.

According to some embodiments, a tag comprises a substrate and an RFID inlay. The substrate may comprise a top surface, a bottom surface, a plurality of panels, and a plurality of fold lines, where each fold line separates adjacent panels, and the RFID inlay may comprise a conductor sheet having a slot formed therein, and a RFID chip electrically coupled to the conductor sheet.

In some embodiments, each panel is a quadrilateral having a top edge, a bottom edge, and two lateral edges. In some embodiments, the top edge is shorter than the bottom edge, and the lateral edges are equal in length. The top edge and the lateral edges may be straight, and the bottom edge may be arched. In some embodiments, the bottom edge is arched upwards towards the top edge.

In some embodiments, the plurality of panels comprises five panels. The five panels may comprise four main body panels and a tab panel. In some embodiments, each main body panel may have a first surface area and the tab panel has a second surface area that is smaller than the first surface area. In some embodiments, the conductor sheet of the RFID inlay is attached to one or more panels on the bottom surface of the substrate. In some embodiments, the conductor sheet is attached to at least half of the panels.

In some embodiments, the RFID chip is electrically coupled to the conductor sheet by an interposer. The strap may bridge the slot formed in the conductor sheet. In some embodiments, the slot extends into the conductor sheet from a bottom edge of the conductor sheet. In some embodiments, the RFID chip is attached to the conductor sheet near a bottom edge of the conductor sheet.

In some embodiments, the top surface of the substrate contains printed indicia. For example, the printed indicia may comprise branding or other information related to a product to which the tag is to be applied. In some embodiments, the printed indicia comprise scannable codes, such as digital watermarks, bar codes, QR codes, and the like. The scannable codes may enable a consumer to use a device, such as a smartphone, to obtain additional information about the product to which the tag is to be applied.

In some embodiments, each fold line separating each panel is formed by a perforation, score line, or partial die-cut. In some embodiments, one or more of the panels comprises a retention tab formed at a top edge of the one or more panels. The retention tabs may be formed in the substrate by a perforation, score line, die-cut, or partial die-cut.

According to other aspects of the disclosure, a method for forming a merchandise providing a tag comprising a substrate and an RFID inlay attached to a bottom surface of the substrate, the substrate comprising a plurality of panels and a plurality of fold lines separating adjacent panels, folding the substrate along each of the fold lines, and securing a first end panel of the substrate and a second end panel of the substrate together such that the RFID inlay is located within the merchandise attachment.

In some embodiments, the method further comprises applying an adhesive to one or both of the first end panel and the second end panel and securing the first end panel and the second end panel together with the adhesive. In other embodiments, the method comprises removing a releasable backing from one or both of the first end panel and the second end panel to expose an adhesive and securing the first end panel and the second end panel together with the adhesive. In some embodiments, the first end panel and the second end panel are secured by one or more tabs formed in one or both of the first end panel and the second end panel.

In some embodiments, the method further comprises deforming one or more retention tabs formed in one or more of the panels towards a center of the merchandise attachment. The retention tabs may be formed in the one or more panels by a perforation, score line, die-cut, or partial die-cut.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION OF THE INVENTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention. Further, to facilitate an understanding of the description, discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The present invention may disclose a merchandise attachment incorporating embedded trigger technology, such as an RFID transponder. The merchandise attachment may include a pliable, elongated panel member adapted for wrapping around the neck of a bottle or similar container. The panel member may be formed from a single, laser-cut blank having score lines that divide the laser-cut blank into a number of panel sections, in the present example five panels are shown. The panel member, when folded along the score lines with its end sections in overlapping relationship, may form a display sleeve. The display sleeve may be shaped as a tapered rectangular prism in a predetermined size in relation to the body and the neck of the container. Other geometric shapes may be used, e.g. square, hexagonal, pentagonal, etc.

In addition, the present invention may be connected to the closure at the top of the bottle or container such as by a frangible bond, e.g. adhesive, such that the merchandise attachment can be used as a tamper indicating feature when the seal is broken. Alternatively, the merchandise attachment can be part of the closure of the bottle or container and then using a tear strip or the like to remove the merchandise attachment from the bottle or container.

In some embodiments, a portion of the antenna of the RFID device may be included as an integral part of the cap or closure element such that when the cap is removed or alternatively the merchandise attachment is remove, there will be a change in the read range of the RFID device which indicates a change in condition, e.g. the opening of the container or bottle. This would also prevent the merchandise attachment from being placed on another container as the RFID device will now provide a different read than an unaltered one.

A RFID transponder may include an RFID chip electrically coupled to an antenna. The RFID chip may be programmed with information about the contents of the container, or data indicative of the identity of the merchandise. The RFID chip may also be programmed with any other information and/or functionality without departing from the scope of the present disclosure. The RFID transponder may communicate with an RFID reader to provide a variety of information about the merchandise (e.g., container) to which it is attached. This may allow the RFID reader to track merchandise as part of an inventory management system and the like. The RFID inlay may enable orientation insensitivity and outstanding edge read performance for a wide variety of tagging applications. For example, the RFID transponder may enable communication from any direction, even when such communication is obscured by surrounding containers, for example, a set of bottles (e.g., when the neck and metal foil of the bottles block a direct path of communication). Consequently, the merchandise attachment with integrated RFID transponder may meet the needs of dense packing and uncontrolled rotation (i.e., product orientation).

The RFID device may also be digitally linked to a URL or other database where the serial number assigned to the bottle or container can be part of a brand protection program to validate the integrity of the bottle or container being purchased.

Figure 1:
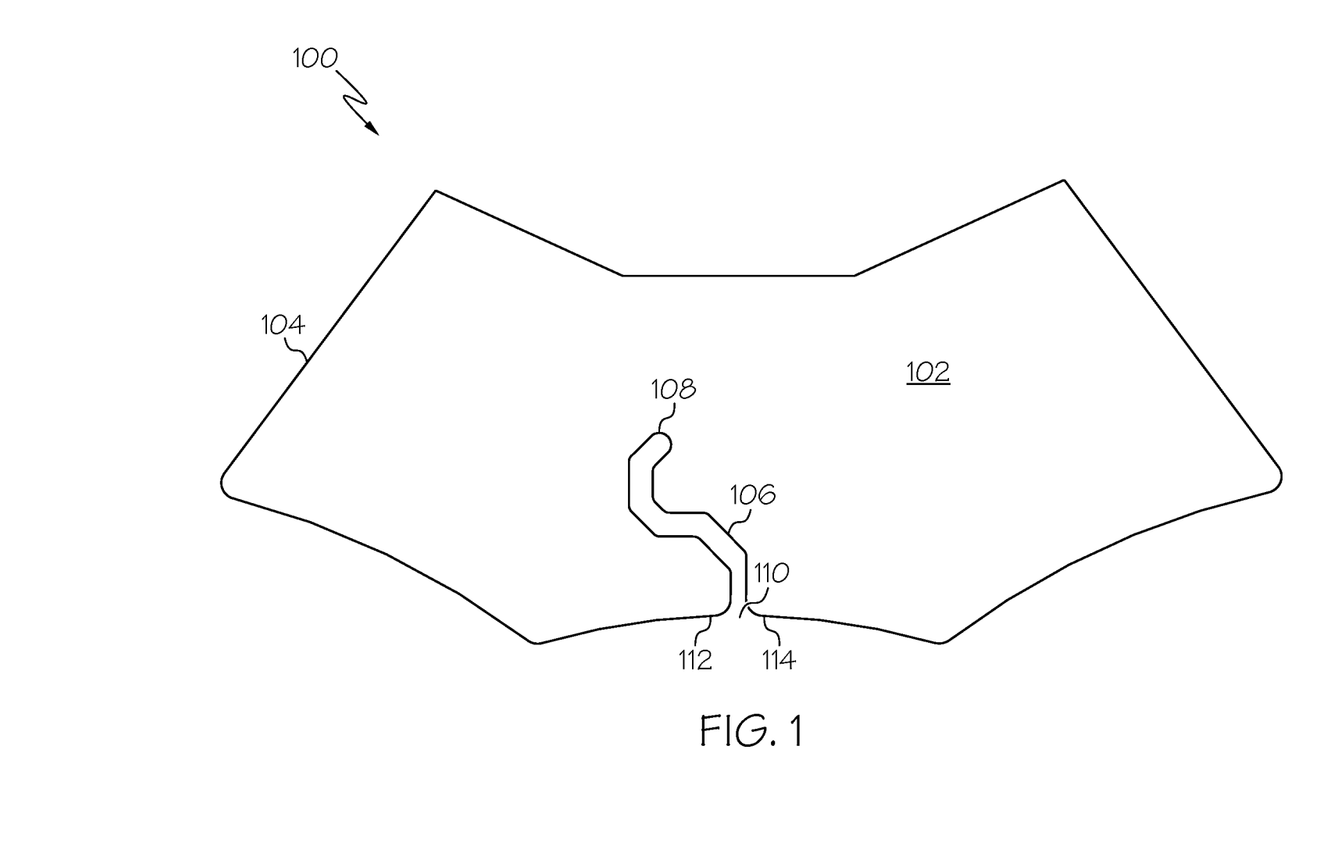
FIG. 1 illustrates a schematic view of an exemplary embodiment of an RFID antenna in accordance with the present invention.

Turning now to the figures, FIG. 1 illustrates a schematic view of an exemplary embodiment of a RFID antenna structure 100 in accordance with the present invention. The RFID antenna 100 may be configured to wirelessly communicate information in radio-frequency signals with a RFID interrogator (not illustrated). As depicted in the illustrated embodiment, the RFID antenna 100 may be of the hybrid loop-slot type, generally referred to as a "sloop" antenna. The RFID antenna 100 may be provided as a substantially flat or planar conductor sheet 102 (e.g., a conductive foil). In some exemplary embodiments, the conductor sheet 102 may be constructed from a relatively thin, electrically conductive material. This may be, for example, any suitable material having sufficiently high electrical conductivity, such as copper, aluminum, and the like. Printed conductive ink may also be used to manufacture the antenna.

The RFID antenna 100 may be defined by a perimeter 104 and a slotted opening 106 extending into conductor sheet 102 from the perimeter 104. The perimeter 104 may be configured to substantially coincide with at least a portion of the perimeter of a laser-cut or other die cut (e.g., mechanical die cut) blank to which the RFID inlay is secured to form a merchandise attachment. Alternatively, the perimeter 104 may be shaped differently than that of the associated blank. The conductor sheet 102 may be relatively large to improve the operation of the RFID transponder. A relatively large conductor sheet 102 may also serve to strengthen and protect the joint between the antenna 100 and the RFID chip (shown in FIG. 2).

The slotted opening 106 may extend inwardly from one of the edges of the perimeter 104 to a termination or closed end 108. The open end 110 may be associated with a first side or edge 112 of the perimeter 104 and a second side or edge 114 of the perimeter 104. It should be contemplated that the space of the opening can vary without departing from the scope of the present disclosure. In some exemplary embodiments, for example (and as shown in FIG. 1), the slotted opening 106 may resemble a backward question mark. The slotted opening 106 may take any other suitable configuration, as would be understood by a person having ordinary skill in the art. Additionally, the slotted opening 106 may be differently positioned and/or oriented within the perimeter 104. The present invention also contemplates that the antenna material may have more than one opening and may define more than one antenna.

Figure 2:
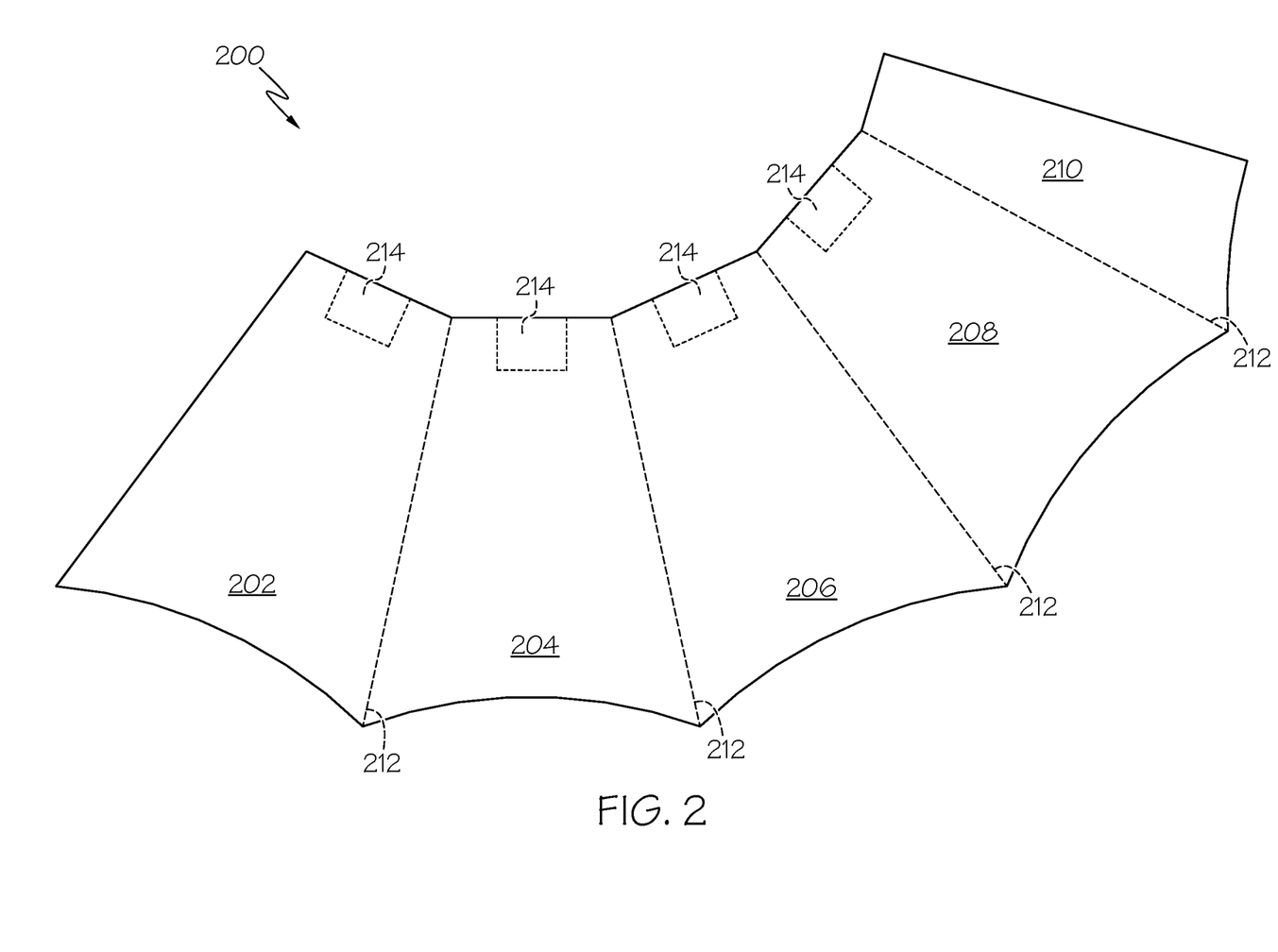
FIG. 2 illustrates a schematic view of an exemplary material blank in accordance with the present invention.

FIG. 2 illustrates a schematic view of an exemplary embodiment of a material blank 200 in accordance with the present invention. The material blank 200 may be constructed from a pliable, elongated material adapted for wrapping around the neck of a bottle or similar container. For example, the material blank 200 may be made from any suitable material capable of being creased, scored, and folded, such as heavy paper, cardboard, corrugated cardboard, plastic coated cardboard or paper, or other similar material. In some embodiments, the material blank 200 is made from one or more plastic materials, such as polyvinyl chloride (PVC), polyethylene terephthalate (PET), other similar materials, or combinations thereof.

The material blank 200 may have score lines 212 that divide the material blank 200 into five panel sections 202, 204, 206, 208, 210. A person of skill in the art will appreciate, however, that any suitable number of panel sections may be used. The material blank 200, when folded along the score lines 212 with its end sections 202, 210 in overlapping relationship, may form a display sleeve having a generally tapered shape. A person of ordinary skill in the art will appreciate that the display sleeve may have any suitable shape, determined at least in part by the shape of panel sections of material blank.

Material blank 200 may have retention tabs 214 formed in one or more of panel sections. As illustrated, a retention tab 214 is formed in four of the panel sections 202, 204, 206, 208. A person of ordinary skill in the art will appreciate that retention tabs 214 may be formed in more or less than four of the panel sections. It is also within the scope of the invention to include more than one retention tab 214 in any of the panel sections. Retention tabs 214 may be formed by a perforation, score line, die-cut, partial die-cut, or any other suitable means that allow the retention tab 214 to be deformed from the plan of the panel section in which it is located. When material blank 200 is assembled into a merchandise attachment 300, as discussed elsewhere herein, and placed over a container such as a bottle, retention tabs 214 may advantageously be deformed towards a center of the merchandise attachment 300 to aid in retaining the merchandise attachment 300 on the container. For example, when used with a bottle, such as a wine bottle, retention tabs 214 of merchandise attachment 300 may engage with the bottle collar to prevent the merchandise attachment 300 from sliding off of the bottle.

Figure 3A:
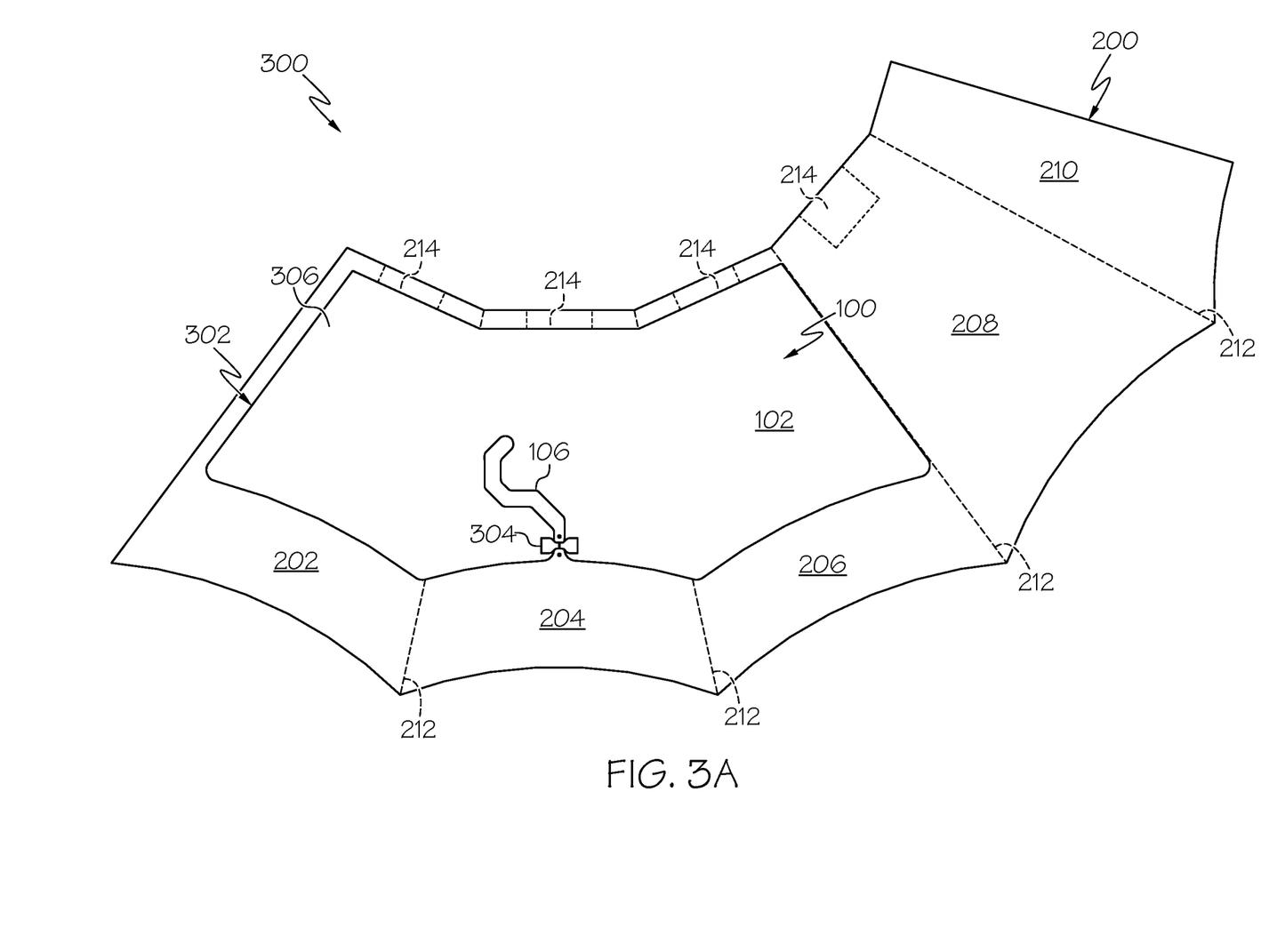
FIG. 3A illustrates a perspective view of an exemplary embodiment of a material blank having a RFID transponder affixed thereto.

FIG. 3A illustrates a perspective view of an exemplary embodiment of a merchandise attachment 300 having a RFID transponder 302 affixed thereto. RFID transponder 302 may attach to an interior surface of the material blank 200 via any suitable approach known in the art, such as by pressure sensitive adhesive, frangible bond, fastener, and the like. The RFID transponder 302 may include an RFID microchip electrically coupled to an antenna 100. The RFID microchip may be directly coupled to the antenna 100, or may be coupled to the antenna 100 by a strap 304, as shown in FIG. 3A. In the illustrated embodiment, the antenna 100 is of the hybrid loop-slot or "sloop" antenna type. Other antenna variations may be contemplated, for example, like those configurations shown in U.S. Pat. Nos. 7,298,343 and 8,072,334, both of which are incorporated herein by reference in their entirety.

In the illustrated embodiment, the antenna 100 may be provided as a substantially flat or planar conductor sheet 102 (e.g., a conductive foil) that traverses three panel sections 202, 204, 206. In other embodiments, the antenna 100 may traverse more or fewer than three panel sections. For example, other numbers of panels may be used to create a particular marketing theme, e.g., origami shaped pieces. As shown in FIG. 3A, the perimeter of the conductor sheet 102 may be configured to substantially coincide with the perimeter of the material blank 200 in its flattened state (as shown in FIG. 3A). For example, the conductor sheet may have an outer perimeter that is approximately or substantially the same shape and width as the perimeter of three panel sections 202, 204, 206. In other exemplary embodiments, the perimeter of the conductor sheet 102 may be differently configured to match a different number of panel sections (e.g., more or fewer than three panel sections), to match the perimeter of a differently shaped panel member, or the conductor sheet 102 may be shaped differently from the associated panel member.

The conductor sheet 102 of the antenna 100 may define a slotted opening 106, as discussed above, the slotted opening 106 (along with the RFID chip and strap 304) being an "active" component of the RFID transponder 302.

The RFID chip may take any number of forms, contain any of a number of possible components, and be configured and programmed to execute any of a number of possible functions, as would be understood by a person having ordinary skill in the art. In one exemplary embodiment, for example, the RFID chip may include an integrated circuit having communications electronics, data memory, and control logic for directing radio frequency communication and other functions of the merchandise attachment. The RFID chip may be electrically coupled to a strap 304 that is attached to the antenna 100 by way of two points at opposite sides of the slotted opening 106. In the illustrated exemplary embodiment, the RFID chip and strap 304 are situated proximate the open end 110 of the slotted opening 106, and aligned substantially parallel thereto. It should be contemplated, however, that the RFID chip and/or strap 304 may be differently configured and/or oriented, although it may be advantageous to space the RFID chip (and, when used, strap 304) away from an area of the material blank 200 likely to be contacted and damaged.

The merchandise attachment 300 may also include an overlaminate 306 that encompasses, and thereby protects, at least a portion of the RFID transponder 302. In one exemplary embodiment, for example, the overlaminate 306 may fully cover the RFID transponder 302, including the RFID chip, strap 304, slotted opening 106, and antenna 100. The overlaminate 306 may be constructed from any suitable material, including a pressure-sensitive polyethylene terephthalate ("PET") film or any polymer that provides the needed resistance to unwanted incursion of outside elements. The overlaminate 306 may be attached to the material blank 200 via any suitable approach, including sealant, adhesive, heat, sealing, and the like.

Figure 3B:
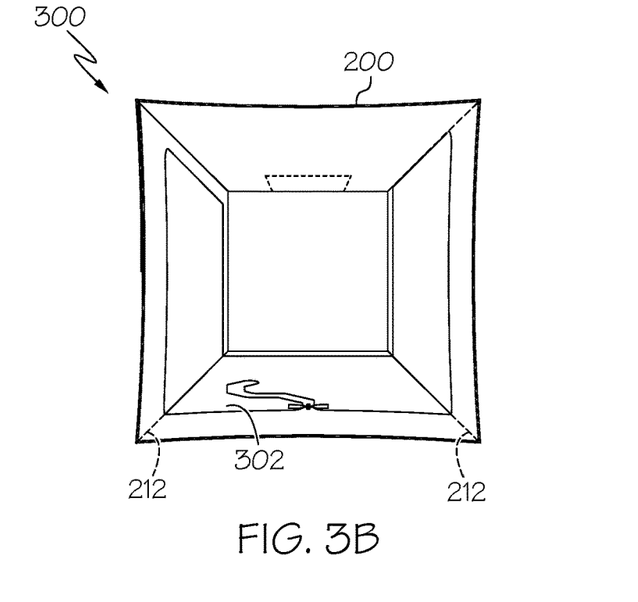
FIG. 3B illustrates a bottom perspective view of an assembled merchandise attachment with RFID transponder.

FIG. 3B illustrates a bottom perspective view of an exemplary embodiment of a merchandise attachment 300 in an assembled state. The merchandise attachment 300 may be constructed from a pliable, elongated material blank 200 adapted for wrapping around the neck of a bottle or similar container. The material blank 200, when folded along the score lines 212 with its end sections in overlapping relationship, may form a display sleeve in the shape of a tapered rectangular prism. The display sleeve may be, for example, a four-sided structure having an open-ended top and bottom portion. The material blank 200 may hold its assembled shape by way of tabs, adhesive, or any other suitable means known in the art. A RFID transponder 302, as well as an overlaminate 306, may attach to an interior surface of the material blank 200, and fold along the same lines 212 therewith.

Figure 4:
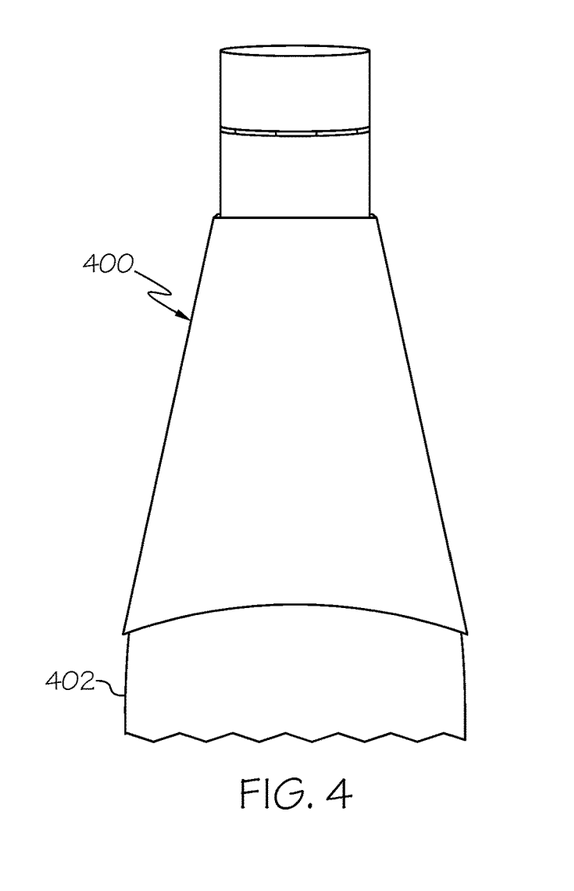
FIG. 4 illustrates a perspective view of an exemplary embodiment of a merchandise attachment mounted to a bottle container.

FIG. 4 illustrates a perspective view of an exemplary embodiment of a merchandise attachment 400 mounted to a container 402. In some exemplary embodiments, the container 402 may be a beverage container with a constricted neck portion, such as a wine or spirits bottle. The container may be formed of a plastic, glass, or equivalent material, as is known in the art. The merchandise attachment 400 may extend completely around the circumference of neck portion, and be removable therefrom.

A RFID transponder (not visible), attached to an interior surface of the merchandise attachment 400, may remain proximate the container 402 when the merchandise attachment 400 is mounted thereto. The RFID transponder may also extend completely or substantially around the circumference of the neck portion.

The exterior surface of the merchandise attachment 400 may be provided with informational material (not shown) regarding the merchandise, such as branding, promotional offers, and the like. This information may be pre-printed directly on the exterior surface of the attachment or otherwise affixed thereto. In some embodiments, the exterior surface of the merchandise attachment 400 is provided with scannable codes (not shown), such as digital watermarks, bar codes, QR codes, and the like. The scannable codes may enable a consumer to use a device, such as a smartphone, to obtain additional information about the product to which the tag is to be applied.

Figure 5:
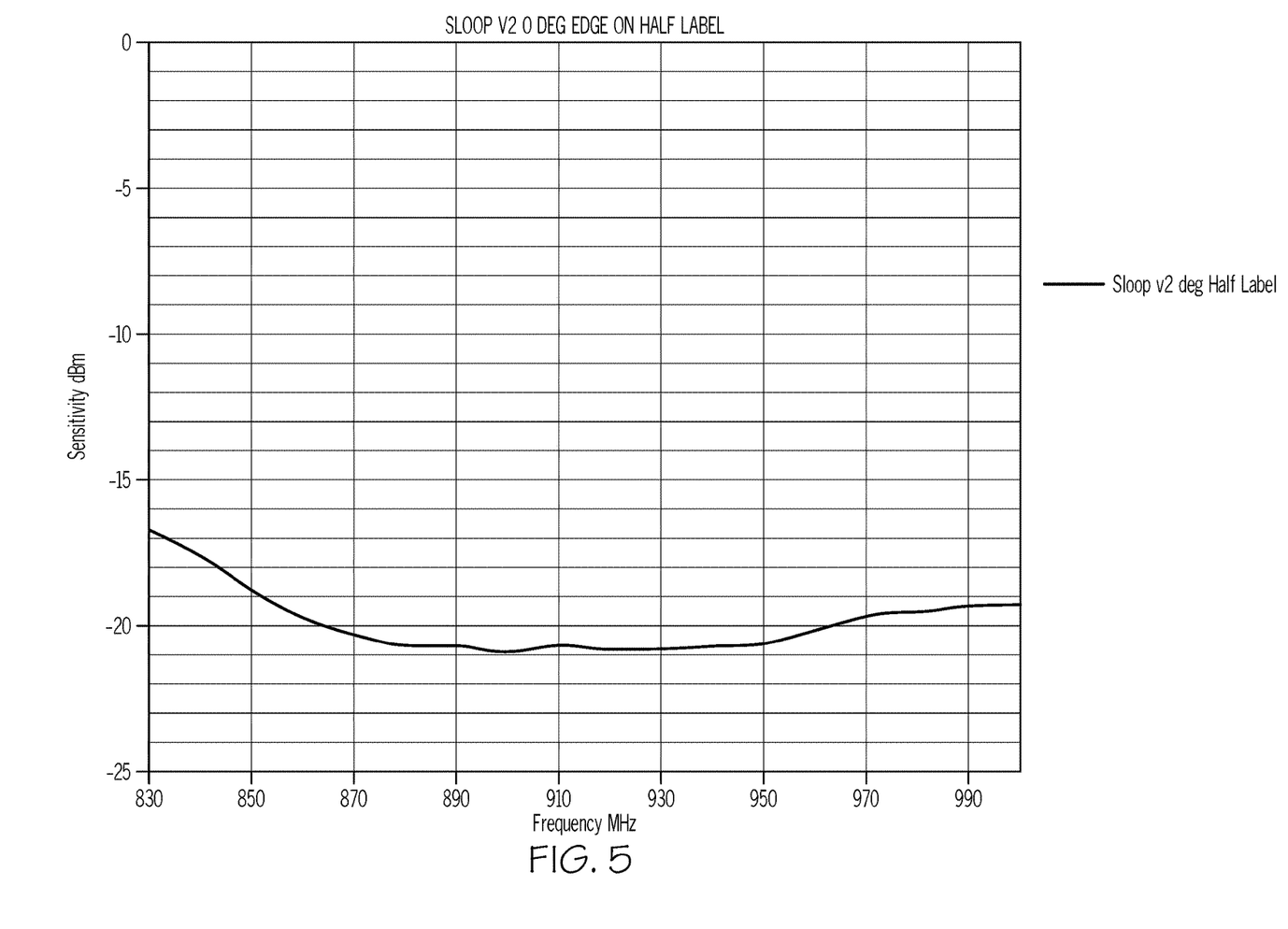
FIG. 5 illustrates a plot of data showing reception sensitivity (dBm) versus frequency (MHz) for the exemplary RFID transponder.

FIG. 5 illustrates a plot of data generated when testing an exemplary RFID transponder. The plot may show reception sensitivity (dBm) versus frequency (MHz) for the exemplary RFID transponder. As illustrated in the graph, the exemplary RFID transponder showed signs of a strong and broad-band response. For example, the exemplary RFID transponder achieved sensitivity above −19 dBm over both E.U. (865-868 MHz) and U.S. (902-928 MHz) bands, with a peak at −21 dBm.

Figure 6:
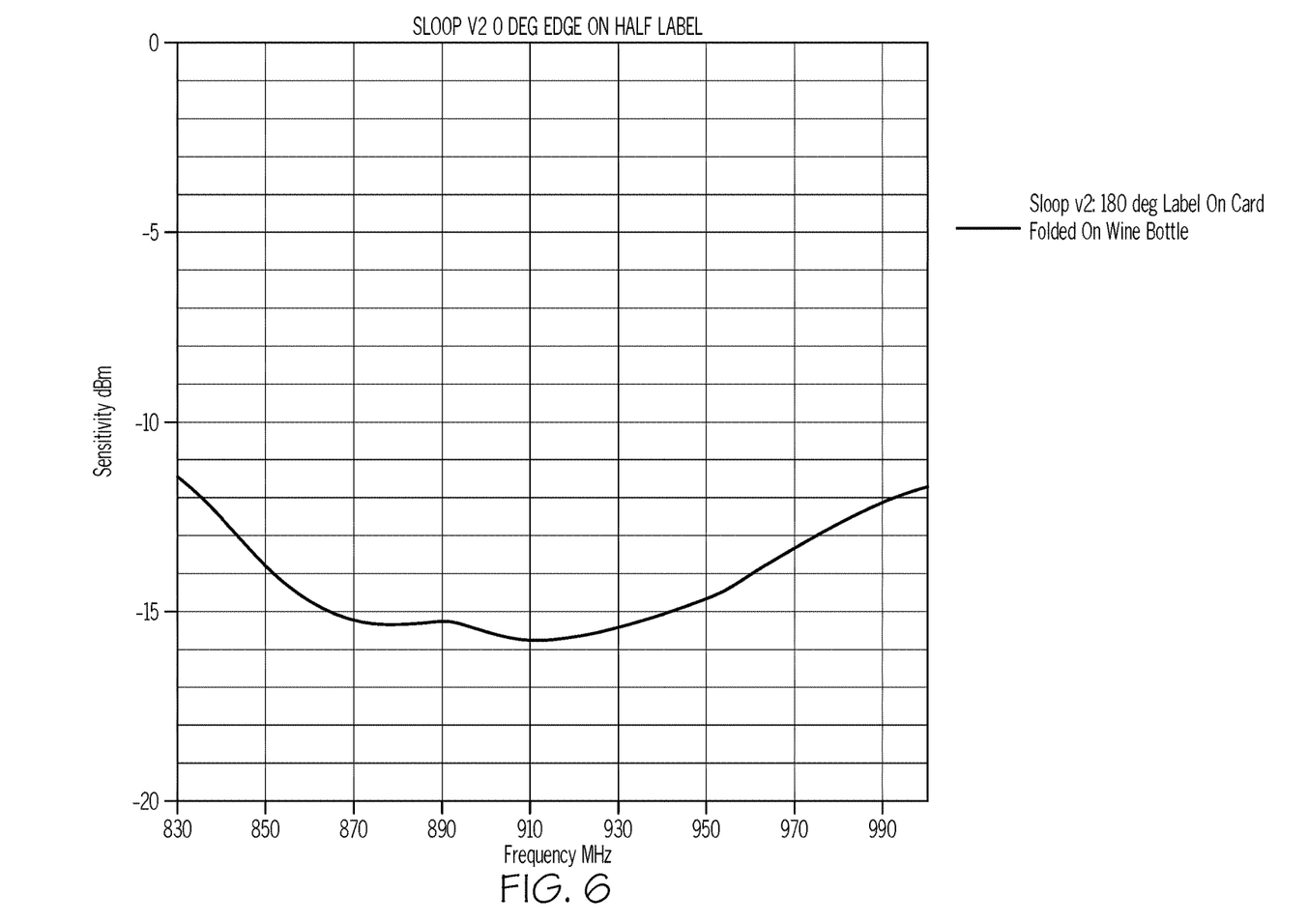
FIG. 6 illustrates a plot of data showing reception sensitivity (dBm) versus frequency (MHz) for an exemplary merchandise attachment.

FIG. 6 illustrates a plot of data generated when testing the exemplary merchandise attachment mounted on a bottle (as depicted in FIG. 4). Specifically, the plot illustrates reception sensitivity (dBm) versus frequency (MHz) for the exemplary merchandise attachment. As shown, the merchandise attachment tested achieved sensitivity above −15 dBm over both E.U. (865-868 MHz) and U.S. (902-928 MHz) bands, a strong response considering the close proximity of the RFID transponder contained in the merchandise attachment to liquid (contained in the bottle), metal (contained on the bottle as a seal), and glass (the bottle itself).

Testing was also performed when the merchandise attachment was obscured by a matrix of bottles, using an MC3190 ETSI reader running at ++27 dBm. With the merchandise attachment buried at the back of a set of bottles, regardless of sleeve rotation (including nominally looking through the bottle), the range was greater than 1 m, and frequently 2-3 m.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments may be made by those skilled in the art without departing from the scope of the invention as defined by the following claims.

What is claimed is:

1. A merchandising piece, comprising;
   a blank of material, the blank divided into a series of panels which are sized and configured so as to fit around a bottle or container, wherein a plurality of fold lines separates adjacent panels and wherein, one or more panels of the series of panels comprises a retention tab formed at a top edge thereof; and
   a RFID inlay, the inlay comprising a conductor sheet having an antenna and a chip connected to the antenna, the RFID inlay designed so as to be able to radiate from the bottle or container, wherein the conductor sheet has an outer perimeter of substantially similar shape and width as a perimeter of two or more panels of the series of panels, and wherein the RFID inlay is placed on at least one of the series of panels and positioned to be interior of the blank once folded by folding along the plurality of fold lines formed in the blank and placed around the container.

2. A tag comprising:
   a substrate comprising
      a top surface,
      a bottom surface,
      a plurality of panels, and
      a plurality of fold lines, where each fold line separates adjacent panels, and wherein each panel of the plurality of panels is formed by folding along two fold lines; and
   a RFID inlay comprising
      a conductor sheet having a slot formed therein, wherein the conductor sheet has an outer perimeter of substantially similar shape and width as a perimeter of two or more panels of the series of panels and
      a RFID chip electrically coupled to the conductor sheet.

3. The tag of claim 2, where each of the panels is a quadrilateral having a top edge, a bottom edge, and two lateral edges.

4. The tag of claim 3, where the top edge is shorter than the bottom edge, and the lateral edges are equal in length.

5. The tag of claim 4, where the top edge and the lateral edges are straight, and the bottom edge is arched.

6. The tag of claim 2, where the plurality of panels comprises five panels.

7. The tag of claim 6, where the five panels comprise four main body panels, where each main body panel has a first surface area, and a tab panel having a second surface area that is smaller than the first surface area.

8. The tag of claim 2, where the conductor sheet is attached to one or more panels on the bottom surface of the substrate.

9. The tag of claim 8, where the conductor sheet is attached to at least half of the panels.

10. The tag of claim 2, where the RFID chip is electrically coupled to the conductor sheet by an interposer.

11. The tag of claim 2, where the slot extends into the conductor sheet from a bottom edge of the conductor sheet.

12. The tag of claim 2, where the RFID chip is attached to the conductor sheet near a bottom edge of the conductor sheet.

13. The tag of claim 2, where the top surface of the substrate contains printed indicia.

14. The tag of claim 2, where each fold line separating each panel is formed by a perforation, score line, or partial die-cut.

15. The tag of claim 2, where one or more of the panels comprises a retention tab formed at a top edge of the one or more panels.

16. A method for forming a merchandise attachment comprising:
   providing a tag comprising a substrate and an RFID inlay attached to a bottom surface of the substrate, the substrate comprising a plurality of panels and a plurality of fold lines separating adjacent panels, and wherein, one or more panels of the series of panels comprises one or more retention tabs each formed at a top edge thereof;
   providing an RFID inlay, the inlay comprising a conductor sheet, the conductor sheet having an outer perimeter of substantially similar shape and width as a perimeter of two or more panels of the plurality of panels;
   folding the substrate along each of the fold lines; and
   securing a first end panel of the substrate and a second end panel of the substrate together such that the RFID inlay is located within the merchandise attachment.

17. The method of claim 16, further comprising applying an adhesive to one or both of the first end panel and the second end panel and securing the first end panel and the second end panel together with the adhesive.

18. The method of claim 16, further comprising removing a releasable backing from one or both of the first end panel and the second end panel to expose an adhesive and securing the first end panel and the second end panel together with the adhesive.

19. The method of claim 16, where the first end panel and the second end panel are secured by the one or more tabs formed in one or both of the first end panel and the second end panel.

20. The method of claim 16, further comprising deforming the one or more retention tabs formed in one or more of the panels towards a center of the merchandise attachment.

* * * * *